United States Patent [19]

Ogura et al.

[11] Patent Number: 4,899,171

[45] Date of Patent: Feb. 6, 1990

[54] THERMAL PRINTER

[75] Inventors: Tokihiko Ogura; Yoshiyuki Mizoguchi; Keiichi Ikeda, all of Yokohama; Tomishige Taguchi, Urawa, all of Japan

[73] Assignee: Canon Kabushiki Kaisha, Tokyo, Japan

[21] Appl. No.: 266,070

[22] Filed: Nov. 2, 1988

[30] Foreign Application Priority Data

Nov. 5, 1987 [JP] Japan ................................ 62-278177

[51] Int. Cl.[4] ......................... G01D 15/10; B41J 11/50

[52] U.S. Cl. ................................ 346/76 PH; 346/136; 400/120; 400/605

[58] Field of Search .......................... 346/76 PH, 136; 400/120, 605

[56] References Cited

U.S. PATENT DOCUMENTS

| | | | |
|---|---|---|---|
| 4,652,154 | 3/1987 | Horiya et al. | 400/120 |
| 4,721,968 | 1/1988 | Arai et al. | 346/136 |

*Primary Examiner*—H. Broome

*Assistant Examiner*—Gerald E. Preston

*Attorney, Agent, or Firm*—Fitzpatrick, Cella, Harper & Scinto

[57] ABSTRACT

A thermal printer comprising first and second supply means for supplying first and second recording mediums, an image processing portion having a memory means for storing black-and-white image and color image informations, an inked sheet having color portions, a recording means for recording images on the first and second recording mediums, and a control means for controlling movements of the first or second supply means and of the inked sheet, in accordance with conditions whether a black-and-white image or a color image is to be recorded.

13 Claims, 13 Drawing Sheets

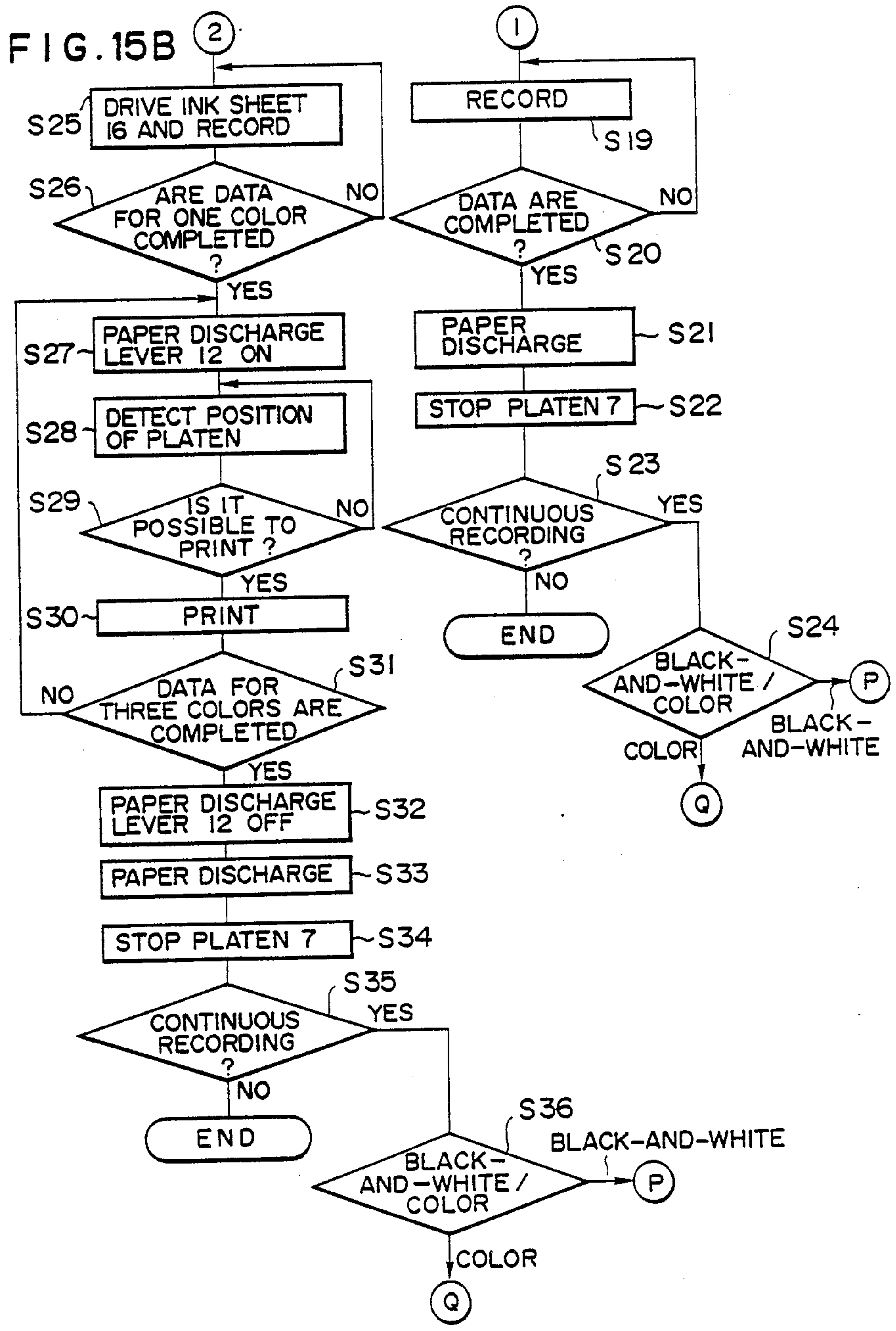
FIG.15B
2
1
DRIVE INK SHEET 16 AND RECORD
S25
S26
ARE DATA FOR ONE COLOR COMPLETED ?
NO
YES
PAPER DISCHARGE LEVER 12 ON
S27
DETECT POSITION OF PLATEN
S28
S29
IS IT POSSIBLE TO PRINT ?
NO
YES
PRINT
S30
DATA FOR THREE COLORS ARE COMPLETED
S31
NO
YES
PAPER DISCHARGE LEVER 12 OFF
S32
PAPER DISCHARGE
S33
STOP PLATEN 7
S34
CONTINUOUS RECORDING ?
S35
YES
NO
END
S36
BLACK-AND-WHITE / COLOR
BLACK-AND-WHITE
P
COLOR
Q
RECORD
S19
DATA ARE COMPLETED ?
NO
S20
YES
PAPER DISCHARGE
S21
STOP PLATEN 7
S22
S23
CONTINUOUS RECORDING ?
YES
NO
END
S24
BLACK-AND-WHITE / COLOR
P
BLACK-AND-WHITE
COLOR
Q

THERMAL PRINTER

BACKGROUND OF THE INVENTION

1. Field of the Invention

The present invention relates to a thermal printer which can effectively perform the image recording on a recording medium.

The thermal printer according to the present invention can be adapted to a color printer which can output a color image from a color computer graphics or a color video player, a facsimile, a copying machine, a word processor or the like.

2. Related Background Art

In the past, in order to record on image by using such a recording apparatus, for example a facsimile, there was used a recording system wherein electric current corresponding to signals is supplied to exothermic elements (thermal head) and a desired image is formed on a heat-sensitive recording medium according to the heated elements, or a recording system wherein a black-and-white image is formed on a recording medium by thermally transferring ink from a black inked ribbon by means of such thermal head has been used.

On the other hand, color printers which can print a color image in the color computer graphics and color video players have recently been developed. For example, there has been proposed a recording apparatus using the afore-mentioned thermal head wherein soluble or sublimable colors such as yellow (Y), magenta (M), cyan (C) and black (Bk) painted on an inked sheet are transferred on the recording medium by means of the thermal head, thereby obtaining multi-color and multi-harmonization images.

However, if it is desired that a black-and-white image be obtained by the above-mentioned color printer, three colors (Y), (M), (C) must be transferred to the same area on the recording medium, or a composite circuit for composing three color (Y,M,C) signals to obtain a luminance signal must be provided so that the image is recorded by using a black inked sheet alone on the basis of such luminance signal.

Further, only when only a black-and-white image is to be recorded, an ink cassette including a black inked ribbon can be used; however, in this case, an operator must change the ink cassettes each time with respect to different kinds of images.

On the other hand, in case of a printing apparatus of a transmission system which can transmit and receive both the black-and-white image and the color image and which can continuously and repeatedly record or print the black-and-white images and the color images at random, both a color printer and a printer for the black-and-white images (black-and-white printer) must be used, thus making the whole system complicated and large-sized.

In addition, in the above system, there is a problem that, when the recording papers for the color image or the recording papers for the black-and-white image are used up during a continuous recording operation, the whole system must be stopped to replenish the vacant papers.

SUMMARY OF THE INVENTION

An object of the present invention is to provide a thermal printer which can effectively perform the image recording on a recording medium.

Another object of the present invention is to provide a thermal printer which can use both of a heat transfer recording system and a heat sensitive recording system.

Other object of the present invention is to provide a thermal printer which can selectively record a color image or a black-and-white image.

A further object of the present invention is to provide a thermal printer which can interchangeably use recording papers for obtaining the color image and recording papers for obtaining the black-and-white image.

A further object of the present invention is to provide a thermal printer which can eliminate the abovementioned drawbacks of the conventional printers, can selectively record the color image and the black-and-white image by the same thermal head, and can interchangeably use the recording paper for the color image or the recording paper for the black-and-white image in each recording.

Another other object of present invention is to provide a thermal printer which can effectively and swiftly perform the image recording by using memory means for storing the image information.

DETAILED DESCRIPTION OF THE PREFERRED EMBODIMENTS

A thermal printer which will be fully explained hereinafter comprises a color recording paper supplying means for supplying recording papers for color images;

heat-sensitive paper supplying means for supplying heat sensitive papers for a black-and-white images; a brightness signal composing circuit for composing a luminance signal or brightness signal from R, G, B signals or from Y, M, C signals; a first recording mode setting means for setting whether the black-and-white image or the color image is to be recorded; a color recording paper detecting means for detecting the absence of the recording paper in the color recording paper supplying means; a heat sensitive paper detecting means for detecting the absence of the heat sensitive paper in the heat-sensitive paper supplying means; a mode changing means for changing a black-and-white image recording mode to a color image recording mode when the heat sensitive paper detecting means detects the absence of the heat sensitive paper; a second recording mode setting means for setting a mode for recording the black-and-white image on the basis of the data outputted from the brightness signal composing circuit when the color recording paper detecting means detects the absence of the recording paper; and a control means for controlling the movements of an inked sheet and the heat-sensitive paper or the recording paper for the color image according to each of the modes set by the first and second recording mode setting means.

In the thermal printer of construction mentioned above, when the absence of the recording paper for the color image is detected in the color image recording mode, a, black-and-white image can be recorded on the heat sensitive paper (for the black-and-white image) by outputting the image data converted to the black-and-white signal from the color signal by means of the brightness signal composing means.

Further, similarly, when the absence of the heat sensitive paper is detected in the black-and-white image recording mode, the image can be recorded on the recording paper for the color image by using the color inked sheet.

An example of the thermal printer according to the present invention will now be fully explained with reference to the drawings.

Figure 1:
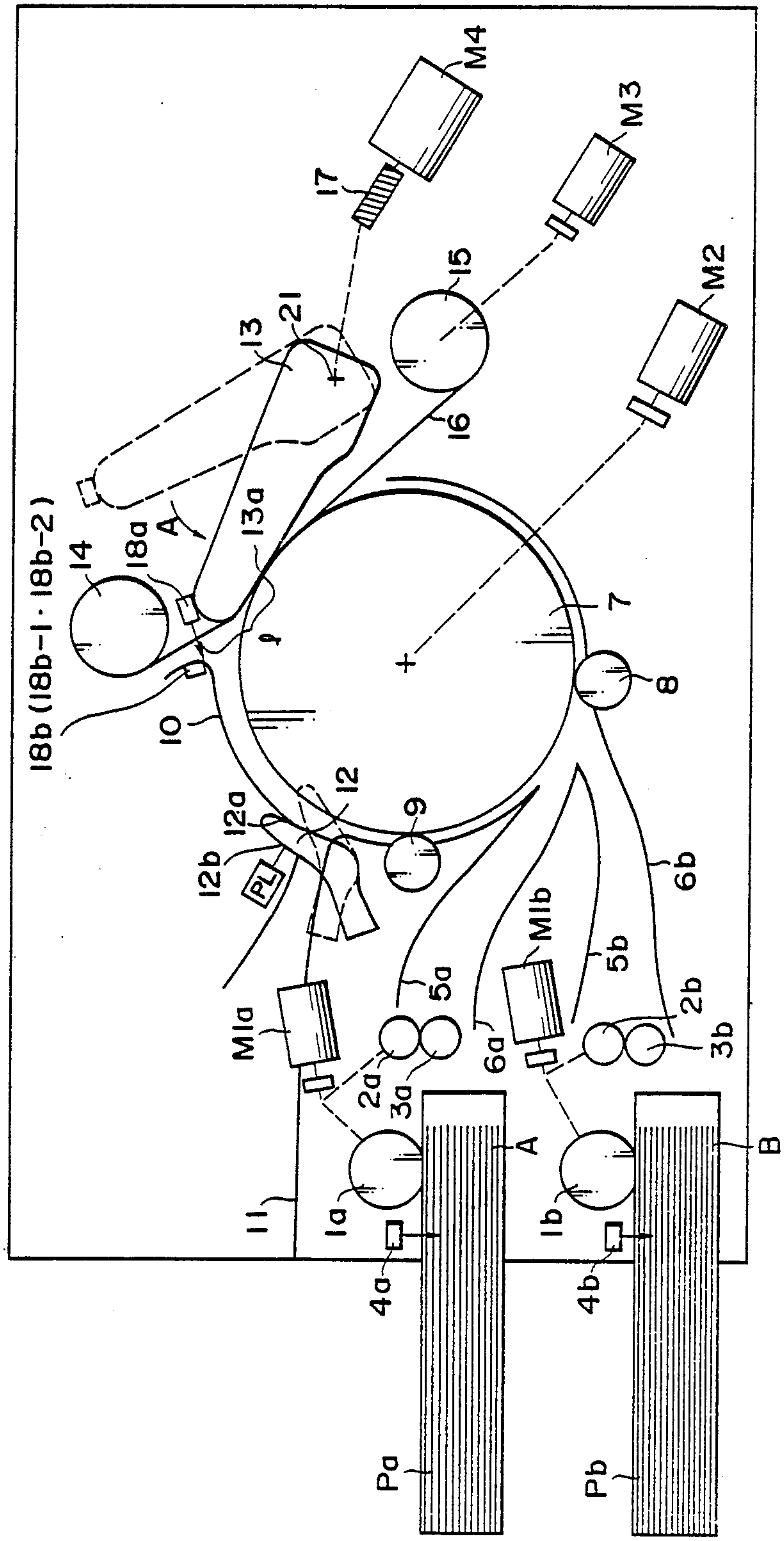
FIG. 1 is a side sectional view of a thermal printer according to an embodiment of the present invention.

FIG. 1 shows a side sectional view of a thermal printer according to an embodiment of the present invention. In FIG. 1, the reference letter A designates a cassette including heat sensitive papers, and the reference letter B designates a cassette including recording papers for the color image. As shown in FIG. 1, in the illustrated embodiment, two cassettes A and B can be mounted together. The cassette A accommodates the heat sensitive papers Pa which become visible when heated, and the cassette B accommodates sublimable heat transfer recording papers Pb each having a receiver layer for receiving the ink sublimed from the ink sheet.

Figure 3A:
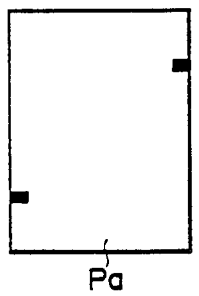
FIGS. 3A and 3B are plan views of recording papers with markings.
Figure 3B:
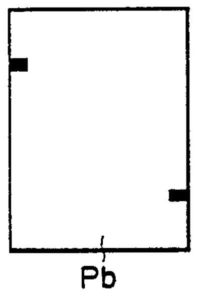

When the size of the paper Pa is the same as that of the paper Pb, the papers may be introduced into the wrong cassette or even plain papers may be introduced into the cassette A or cassette B. Accordingly, in the thermal printer according to the illustrated embodiment, as shown in FIGS. 3A and 3B, markers are provided on the back surface of each of the recording papers Pa and Pb. And, reflect-type photo-sensors 4*a* or reflect-type photo-sensors 4*b* arranged in confronting relation to the markers on the papers when introduced into the cassette determine whether the introduced papers are the heat sensitive papers Pa or the recording papers Pb for the color image. Accordingly, if the papers Pb are erroneously introduced into the cassette A, or the papers Pa are erroneously introduced into the cassette B, or the papers are inversely introduced into the cassette, or the plain papers having no markers are introduced into the cassette A or B, the photo-sensors 4*a* or 4*b* do not detect the papers, thus indicating the absence of the paper on an appropriate display (not shown) or automatically changing the recording papers as will be explained later.

The recording papers Pa, Pb accommodated in the corresponding cassettes A, B are supplied to the printer by means of pick-up rollers 1*a*, 1*b*, separating rollers 2*a*, 3*a*; 2*b*, 3*b* and the like. The rollers are driven by motors M1a and M1b. By selectively energizing these motors, the recording paper Pa or the recording paper Pb is supplied.

The recording paper Pa or Pb supplied by the above paper supplying mechanism is fed to a platen 7 through paper guides 5*a*, 6*a*and 5*b*, 6*b*. Pinch rollers 8 and 9 are pressed against the platen 7 by means of appropriate springs (not shown). The recording paper is fed through nips between the pinch rollers and the platen. A stepping motor M2 drives the platen through an appropriate reduction gear (not shown). The reference numeral 10 designates a paper guide, and 11 designates a discharge tray for receiving the recording paper left from the platen.

Paper guide levers 12 are controlled by a spring (not shown) and a plunger PL. When the plunger PL is energized, the paper guide levers are brought into a position shown by a solid line under the attractive force of the plunger, whereas, when the plunger is disenergized, the paper guide levers are shifted in a position shown by a broken line under the action of the spring.

Figure 5:
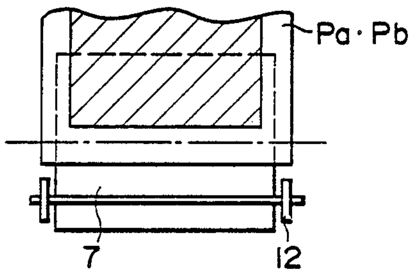
FIG. 5 is a plan view showing the arrangement of paper guide levers, platen and recording paper in the thermal printer of FIG. 1.

FIG. 5 shows the relation between the platen 7, the paper guide levers 12 and the width of the recording paper. The platen 7 has a width slightly smaller than those of the recording papers Pa, Pb, and has a recording face which can be contacted by the head 13 through the whole recording area (shown by a hatched area in FIG. 5). Further, the paper guide levers 12 are arranged on both sides of the platen 7 and are separated by a distance smaller than the width of the recording paper so as to guide the recording paper. Accordingly, as shown in FIG. 1, when the paper guide levers 12 are positioned in the position shown by the solid line, the recording paper is guided by lower edges 12*a* of the guide levers 12, and then fed into the recording position of the head 13 again through the pinch rollers 9 and 8. Whereas, when the paper guide levers 12 are positioned in the position shown by the broken line, the recording paper is guided by upper edges 12*b* of the guide levers 12, thus separating the recording paper from the platen and feeding it into the discharge tray 11.

Next, a mechanism for pressing the head 13 against the platen 7 will be explained. The head 13 is pressed against the platen 7 with the interposition of an inked sheet 16 and the recording paper by the action of a motor M4. More particularly, the rotational movement obtained from a worm gear 17 fixed to a motor shaft of the motor M4 is transmitted to gears 19 and 20 (FIG. 2) through an appropriate reduction gear (not shown). The gear 20 is mounted on a head driving shaft 21 to which the head 13 and a rotary disc 22 are integrally fixed. The gear 20 is connected to the rotary disc 22 by means of a torsion coil spring 23. Accordingly, when the gear 20 is rotated in an anti-clockwise direction shown by an arrow by means of the motor M4, the rotary disc 22 is also rotated in an anti-clockwise direction through the torsion coil spring 23, thereby rotating the shaft 21 and accordingly the head 13 in a direction shown by an arrow A in FIG. 1, thus contacting the head 13 with the platen 7. A further rotation of the gear 20 in the anti-clockwise direction by means of the motor M4 charges the torsion coil spring 23, and the head 13 is pressed against the platen 7 by such charge force. In this case, by detecting an angle of rotation of the gear 20 by means of a detector S, the data regarding an amount of the charge of the torsion coil spring 23 can be obtained, and thus, the pressing force of the head 13 against the platen 7 can be controlled at two stages. The two-stage pressing forces include an optimum pressing force required when the heat sensitive recording paper Pa is used, and an optimum pressing force required when the sublimable heat transfer recording paper Pb is used. On the other hand, when the motor M4 is driven reversely, the gear is rotated in a clockwise direction (FIG. 2), thereby rotating the head 13 in a direction opposite to that shown by the arrow A to bring it into a position shown by a broken line, thus disengaging the head from the platen 7.

Figure 2:
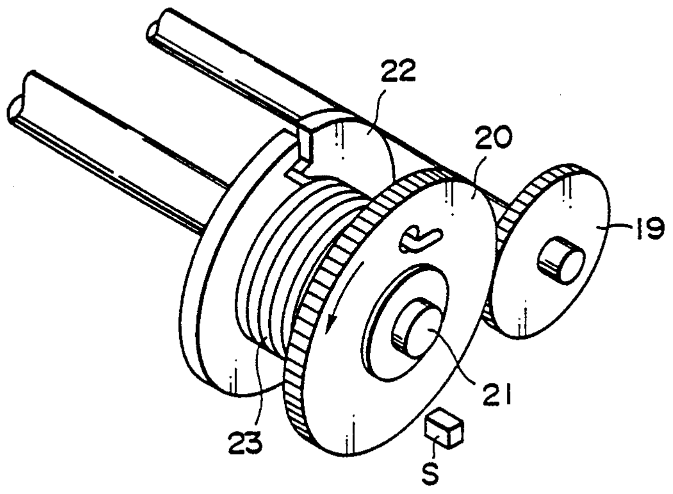
FIG. 2 is a perspective view showing a pressing mechanism for the thermal head of FIG. 1.

Further, the head pressing mechanisms (each including the gears 19, 20, rotary disc 22 and torsion coil spring 23) as shown in FIG. 2 may be provided on both of two base plates (not shown) for supporting platen 7 in order to obtain uniform pressing force (of the head 13 against the platen 7) through the whole width of the head. Further, since the worm gear 17 is mounted on the motor shaft of the motor M4, even when the motor M4 is disenergized after the head 13 is pressed against the platen 7 by the charge force of the torsion coil spring 23, the motor shaft of the motor M4 is reversely rotated by the charge force of the torsion spring 23, whereby the pressing of the head against the platen 7 is not released.

Figure 4:
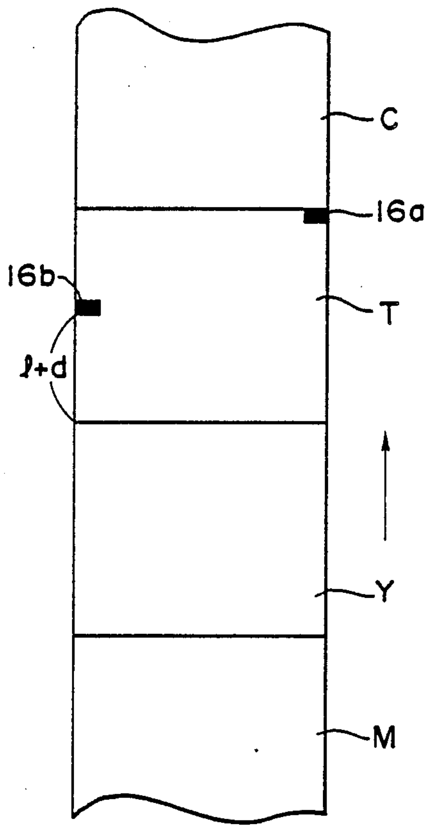
FIG. 4 is a plan view of an inked sheet used in the thermal printer according to the above embodiment.

Next, the construction of the inked sheet 16 and a driving system for such inked sheet will be explained. As shown in FIG. 4, the inked sheet 16 includes a transparent section T having two markers for detecting the position of the sheet, an yellow dye section Y, a magenta dye section M and a cyan dye section C, and these four sections are repeatedly positioned in order. The transparent section T is utilized when the heat sensitive recording paper Pa is used. On the sections Y, M, C, the sublimable dye is painted respectively. These dye sections are utilized when the sublimable heat transfer recording paper is used.

Figure 6:
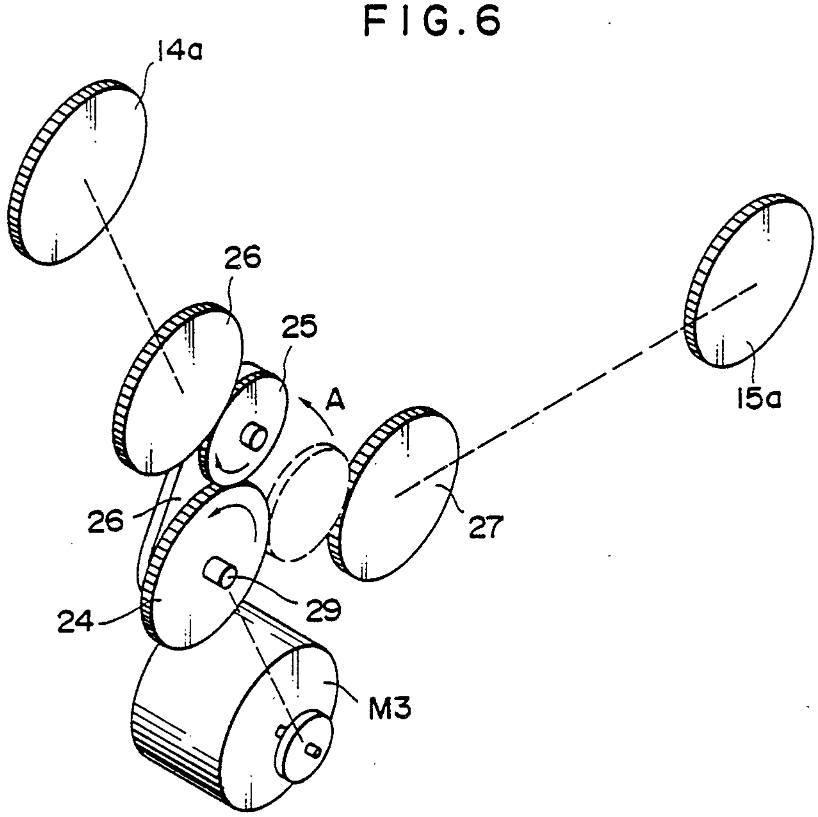
FIG. 6 is a perspective view showing a mechanism for taking up the inked sheet.

FIG. 6 shows a mechanism for feeding the inked sheet. The mechanism is driven by a stepping motor M3. The mechanism comprises a gear **14*a* mounted on a shaft of a take-up reel 14 (FIG. 1), a gear 15*a* mounted on a shaft of a take-up reel 15, a gear 24 mounted on a metal shaft 29 rotatably supported by a flat plate 28, and a gear 25 rotatably mounted on a metal shaft fixed to the flat plate 28. The flat plate 28 can turn around the shaft 29. Further, a friction force acts between the gear 24 and the flat plate 28. Thus, a planetary gear mechanism is constituted by these elements. Accordingly, when the inked sheet 16 is wound on the take-up reel 14, the gear 24 drivingly connected to the motor M3 is rotated in an anti-clockwise direction as shown by an arrow in FIG. 6. In this case, the flat plate 28 is turned in an anti-clockwise direction shown by an arrow A due to the friction force between the plate 28 and the gear 24. Thereafter, the flat plate is stopped in a position shown by a solid line, by engaging with an appropriate stopper (not shown). Consequently, the gear 25 is engaged by a gear 26 connected to the gear 14*a*, thereby transmitting the rotational movement of the motor M3 to the gear 14*a*, thus rotating the take-up reel 14 to wind up the inked sheet 16**.

On the other hand, when the inked sheet 16 is wound on the take-up reel 15, the motor M3 is driven in a reverse direction to rotate the gear 24 in a clockwise direction opposite to the direction shown by the arrow in FIG. 6. Consequently, the flat plate 28 is turned in a direction opposite to that shown by the arrow A, thus bringing the gear 25 into a position shown by a broken line. In this position, the gear 25 is engaged by a gear 27. Accordingly, the rotational movement of the motor M3 is transmitted to the gear **15*a* through the gear 24, gear 25, gear 27 and an appropriate gear train (not shown), thus rotating the take-up reel 15 to wind up the inked sheet 16**.

As mentioned above, by adopting the planetary gear system, the driving force of the motor M3 can always be transmitted to the shaft of the take-up reel 14 or 15 to be wound. Further, the gears **14*a* and 14*b* are subjected to friction force by appropriate mechanisms (not shown). Thus, when the take-up reel 14 or 15 acts as a driven feed reel, the reel is braked by the friction force, thus preventing the slack of the inked sheet. Further, the pressing force of the head (against the platen) are adjusted that, even when the platen 7 is rotated while the head 13** is being pressed against the platen, the slack of the inked sheet due to friction force between the recording paper and the inked sheet or static electricity can be prevented.

In FIG. 1, a transmission-type photo-sensor is tor **18*b*, which is used for detecting a marker 16*a* formed on the inked sheet. A similar transmission-type photo-sensor is provided apart from the former one in a transverse direction of the recording paper, for detecting the other marker 16*b* formed on the inked sheet 16**.

Further, a length of the transparent section of the inked sheet is so selected that the length $(l+\alpha)$ between the lower marker **16*b* and the trailing edge of the transparent section is slightly longer than the distance between sensors 18*a*, 18*b* and the head 13 in the printer by $\alpha$, as shown in FIG. 4. Accordingly, as long as the sensors 18*a*, 18*b* are positioned between the markers 16*a* and 16*b*, the head 13** always faces the transparent section of the inked sheet.

In addition, it should be noted that the reduction ratio in the reduction systems for the stepping motors M2 and M3 is so selected that, when the stepping motors M2 and M3 are similarly driven, the feed rate of the recording paper is the same as the feed rate of the inked sheet in the position where the head 13 contacts the platen.

Figure 7A:
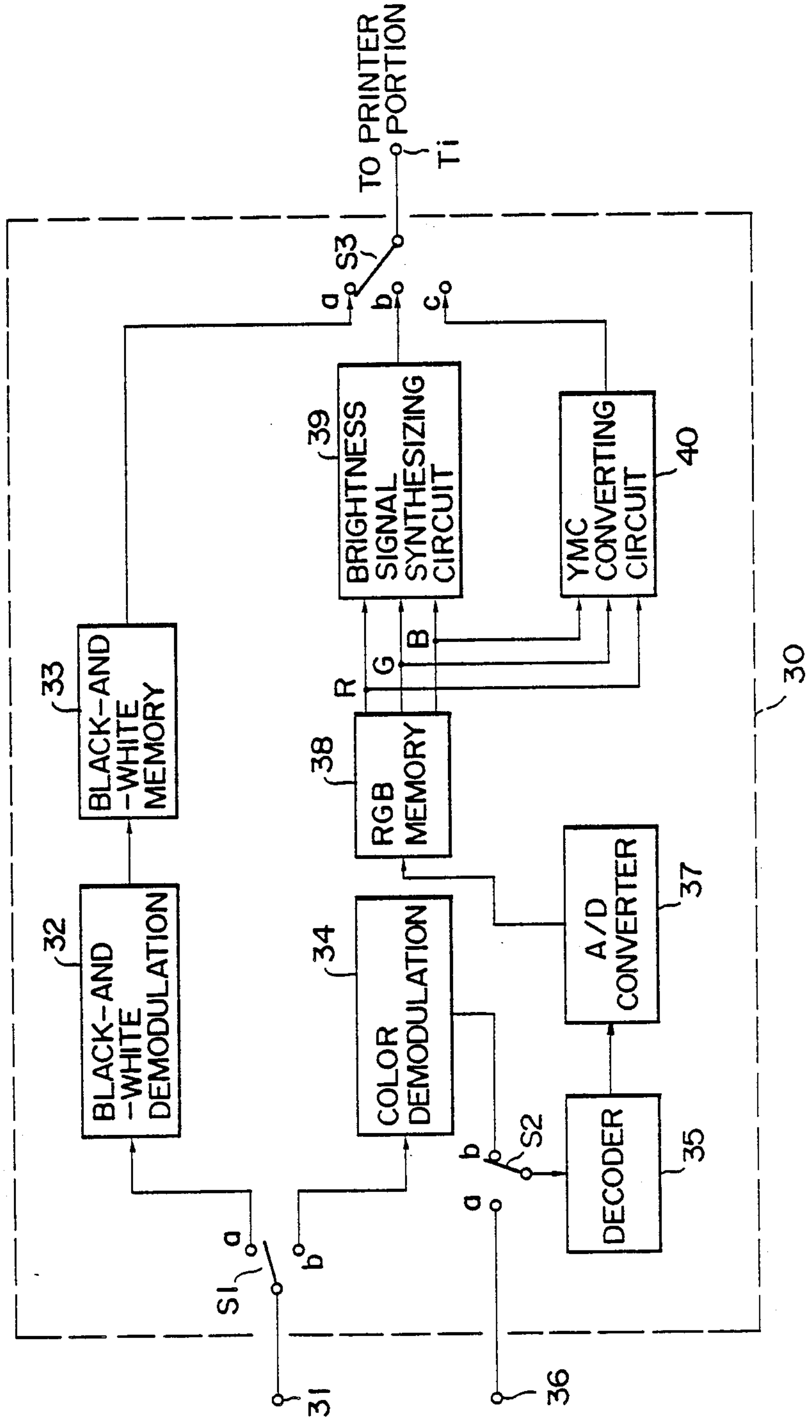
FIGS. 7A and 7B are block diagrams showing an image processing portion and a printer portion, respectively.
Figure 7B:
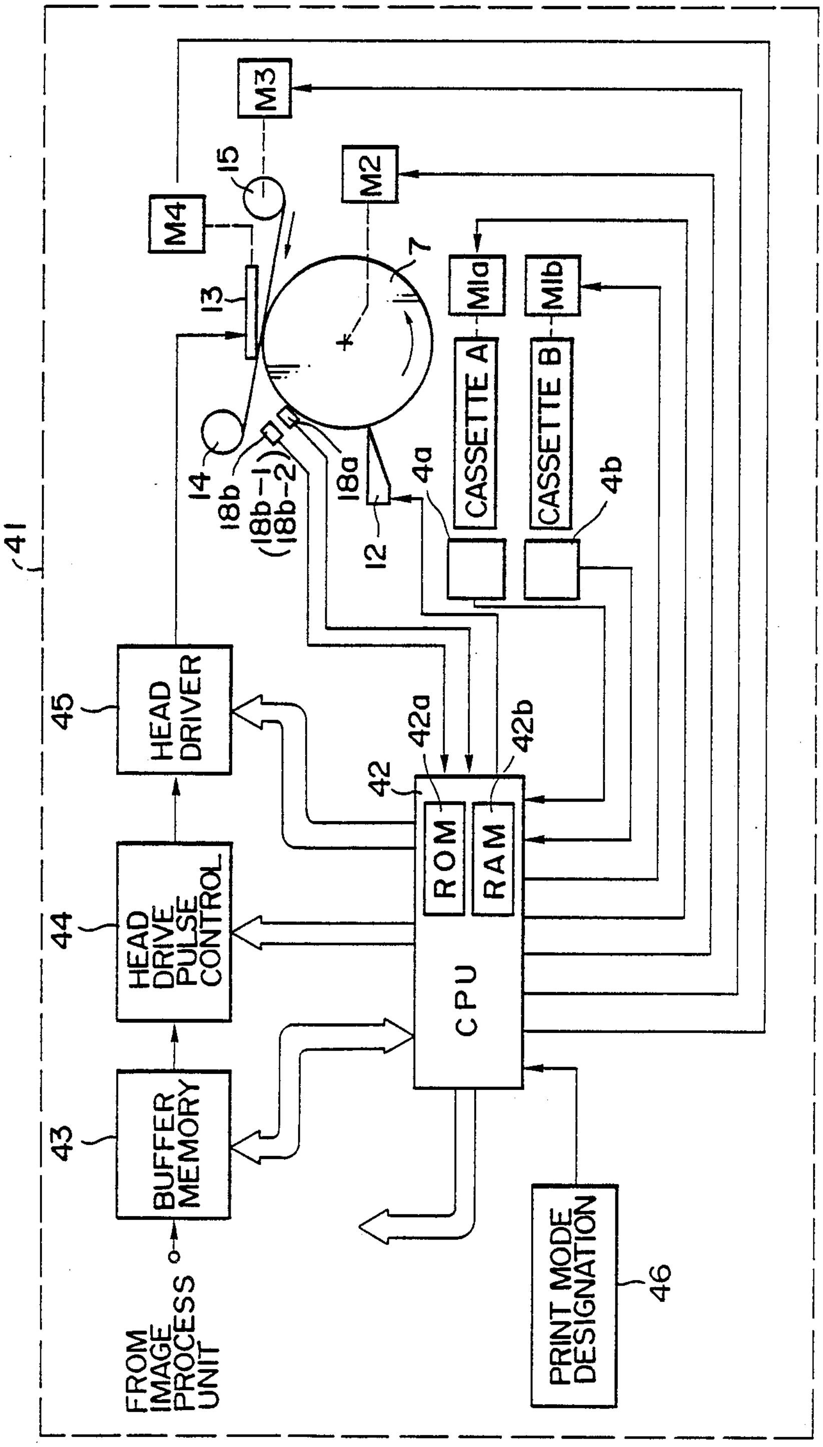

FIGS. 7A and 7B show block diagrams showing circuits of an image transmission system according to an embodiment of the present invention. Particularly, FIG. 7A shows an inputted image treatment section, and FIG. 7B shows a printer section having the construction shown in FIG. 1.

In the image treatment section 30, a black-and-white facsimile image or a color image sent from an input terminal 31 of a telephone circuit is switched by a switch S1 and is inputted. The black-and-white image is inputted to a black-and-white demodulator 32 to be demodulated and then is stored in a black-and-white memory 33 as digital data of a single picture or plural pictures, by, for example, 2,000,000 picture elements (2 M bits) of the number of the picture elements per one page of A4 size.

On the other hand, the color image sent from the telephone circuit is inputted to a color demodulator 34, where the image is demodulated to an NTSC signal or a color difference signal, and then is decomposed to R, G, B signals by a decoder 35. The image treatment section includes a video input terminal 36 other than the telephone circuit input terminal 31, and the image signal sent from the video input terminal 36 is also inputted to the decoder 35 by switching over a switch S2. The color image signal decomposed by the decoder 35 to the R, G, B signals is converted, for each of R, G, B signals, by an A/D converter 37, to data of six bits per one picture element, for example, and then is stored in an RGB memory.

A brightness signal composing or synthesizing circuit 39 composes a brightness signal on the basis of the R, G, B signals from the RGB memory 38 by operation. As will be explained later, this signal is converter to a harmonization data of black-and-white one bit or plural bits in order to permit the image inputted as the color image to record on the heat sensitive paper Pa as the black-and-white image. A YMC circuit 40 is a color converting circuit for converting the RGB signal data to a C (cyan) signal, M (magenta) signal and Y (yellow) signal, respectively. A switch S3 can switch over a black-and-white image data signal line a, a line b for the color image data signal converted to the black- and-white signal, and a line c for the color image data signal converted to the YMC signal data, thereby selectively sending each of the signals to the printer section or printer portion 41 shown in FIG. 7B through an image data output terminal Ti. Each of the above circuit blocks and each of the above switches are controlled by a CPU 42 shown in FIG. 7B. The CPU 42 includes a ROM 42_a_ accommodating a treatment sequence which will be explained later, and a RAM 42_b_ used as a work area in the control.

Figure 8:
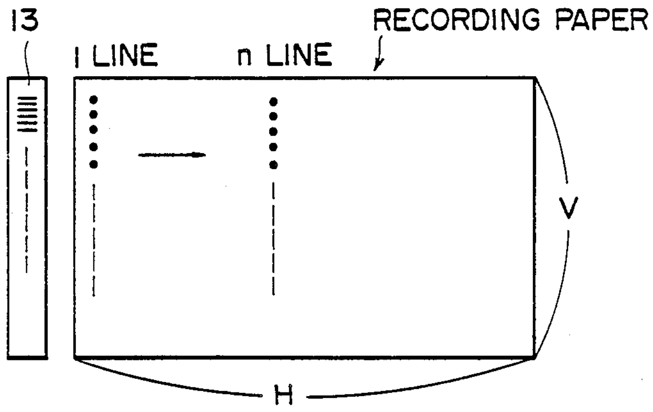
FIG. 8 is a conceptional view showing the contents of a buffer memory.

In the printer portion 41, the image data sent from the image treatment section, i.e., image process unit 30 is inputted to a buffer memory 43 sequentially per one line of the image to be recorded as shown in FIG. 8. The image data, after it has once stored in the buffer memory 43, is then outputted to a head-drive pulse control circuit 44 in synchronism with the recording speed under the control of the CPU 42.

Figure 9:
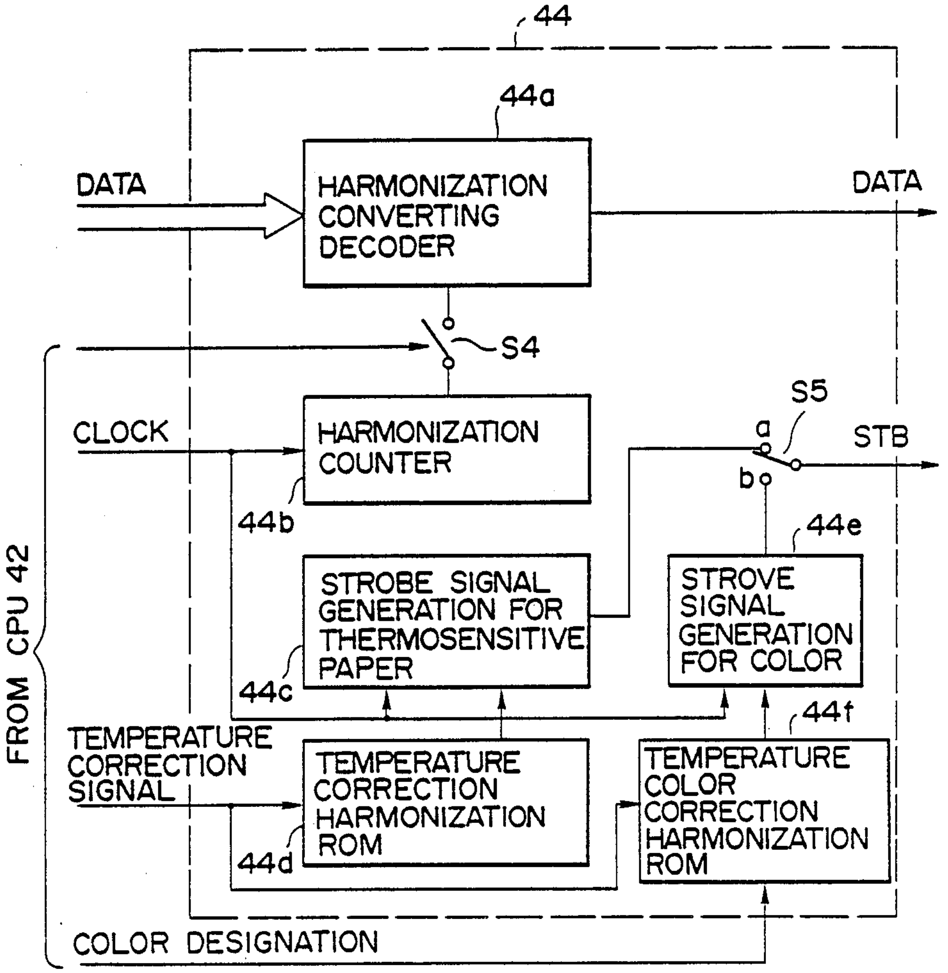
FIG. 9 is a block diagram showing a head driving pulse control circuit shown in FIG. 7B.

The head-drive pulse control circuit 44 has a construction as shown in FIG. 9. More particularly, when the black-and-white 2 bits image data such as a document FAX and the like are inputted, a switch S4 remains open (OFF) and a harmonization recording is not effected, whereas a strobe signal generator 44_c_ for the thermosensitive (heat sensitive) paper controls the pulse width of a strobe signal STB for the thermosensitive paper with reference to the correction data, from a temperature correction ROM table 44_d_, on the basis of a temperature correction signal outputted from a head temperature detector (not shown), thereby recording the image with a predetermined density. In this case, a switch S5 contacts to a.

Figure 10:
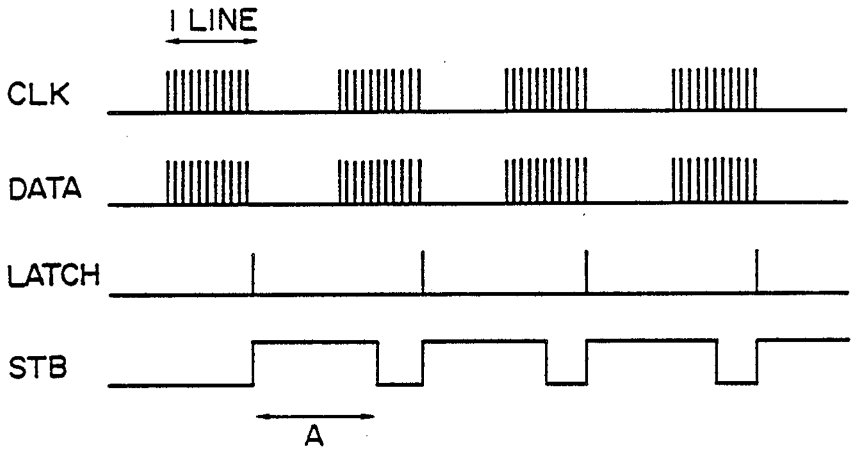
FIG. 10 shows signal pulse waves for driving the thermal head in the above embodiment.

FIG. 10 shows drive and control pulses sent to the thermal head 13 this time, and only when the strobe signal STB is "ON", the pulses based on the image data are sent to exothermic resist elements 13_a_.

Figure 11:
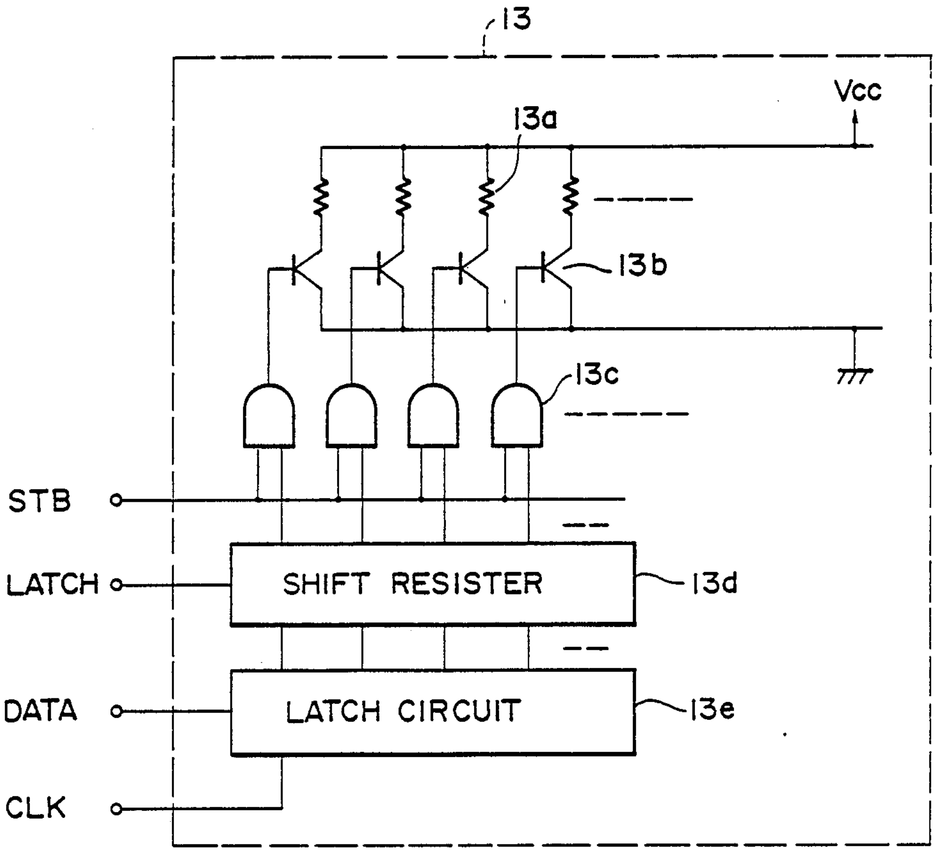
FIG. 11 is a block diagram showing the details of the thermal head in the above embodiment.

FIG. 11 shows a construction of the thermal head 13. The head includes the afore-mentioned exothermic resist elements 13_a_, output transistors 13_b_, AND circuits 13_c_, a latch circuit 13_d_ and a shift resistor 13_e_. Serial data inputted to the shift resistor 13_e_ are sequentially shifted by a clock pulse CLK and converted to parallel data. The data corresponding to each of the exothermic resist elements 13_a_ are held by the latch circuit 13_d_, the timing and time for applying voltage are determined by the strobe signal STB, and the output transistors 13_b_ corresponding to the exothermic resist elements associated with the data are energized, thus The decoder 44_a_ shown in FIG. 9 is a harmonization converting decoder for transferring the harmonization data per picture element to each resistor (of the shift resistor 13_e_) corresponding to each picture element by the number of harmonization. When the abovementioned black-and-white two bits image is processed or treated, the harmonization data is converted to "1" or "0", and is transferred once while one line is being recorded.

Figure 12:
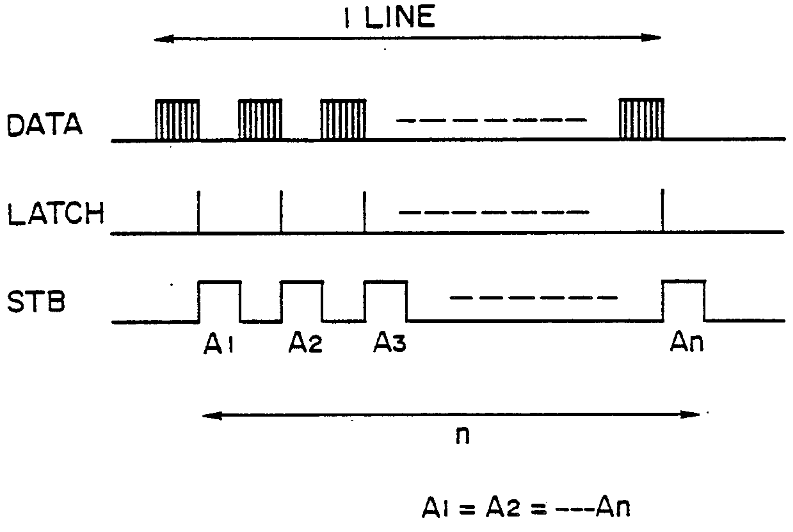
FIG. 12 shows signal pulse waves for driving the thermal head in the above embodiment.

Next, the recording of the harmonization image by the black-and-white image will be explained. In this case, in FIG. 9, the switch S4 is energized (ON). If it is assumed that the data per one picture element inputted to the decoder 44_a_ is constituted by six bits, the number of possible data will be sixty-four per one picture element. In this case, for example, if the data is the black data, the data is converted in comparison with the harmonization data outputted from a harmonization counter 44_b_ so that the data is transferred to the resistor (in the shift resistor of the head 13) corresponding to the one picture element to be recorded by sixty-four-times while one line is being recorded. In this case, the widths of the pulses of the strobe signal STB are equal to each other, as shown in FIG. 12, and the pulses are generated by the number n of the harmonizations.

On the other hand, when the color image is processes, the harmonization converting is effected for each of the colors Y, M, C by means of the decoder 44_a_. In this case, the switch S5 contacts b, and the recording is performed by the strobe signal. A temperature/color correction harmonization ROM table 44_f_ shown in FIG. 9 includes or stores correction data so that the optimum harmonization feature can be obtained for each of the colors on the basis of the outputs from the head temperature detector (not shown).

Figure 13:
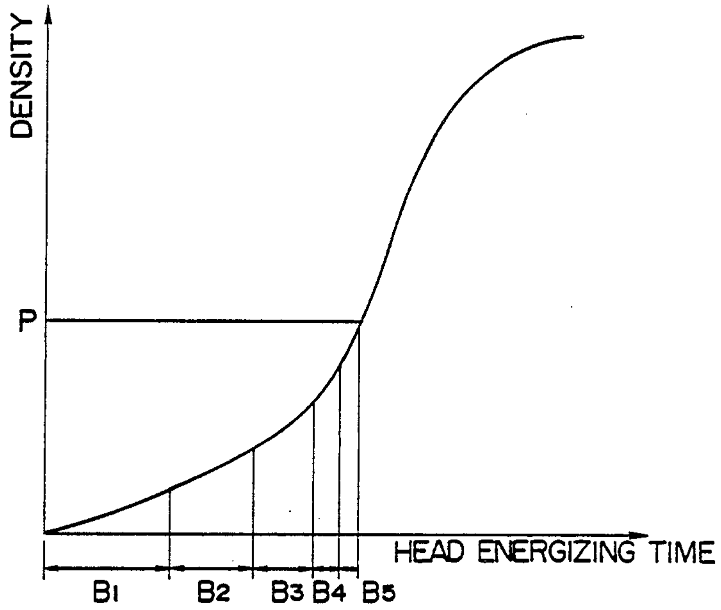
FIG. 13 is a graph showing the relation between a head energizing time and image density.

FIG. 13 shows the relation between the head energizing time and the density. In order to obtain the density P, the exothermic resist elements 13_a_ are energized by the time B1+B2+B3+B4+B5.

Figure 14:
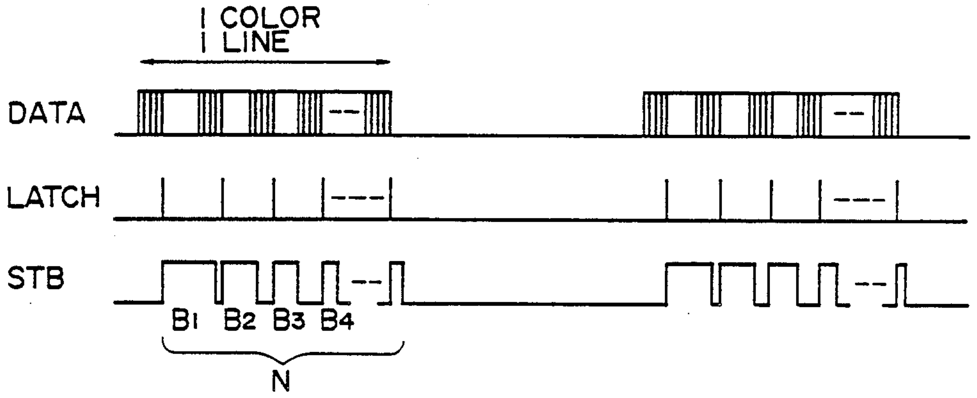
FIG. 14 shows signal pulse waves for driving the thermal head in the above embodiment.

FIG. 14 shows head-drive and control pulses when the color image is recorded.

Figure 15A:
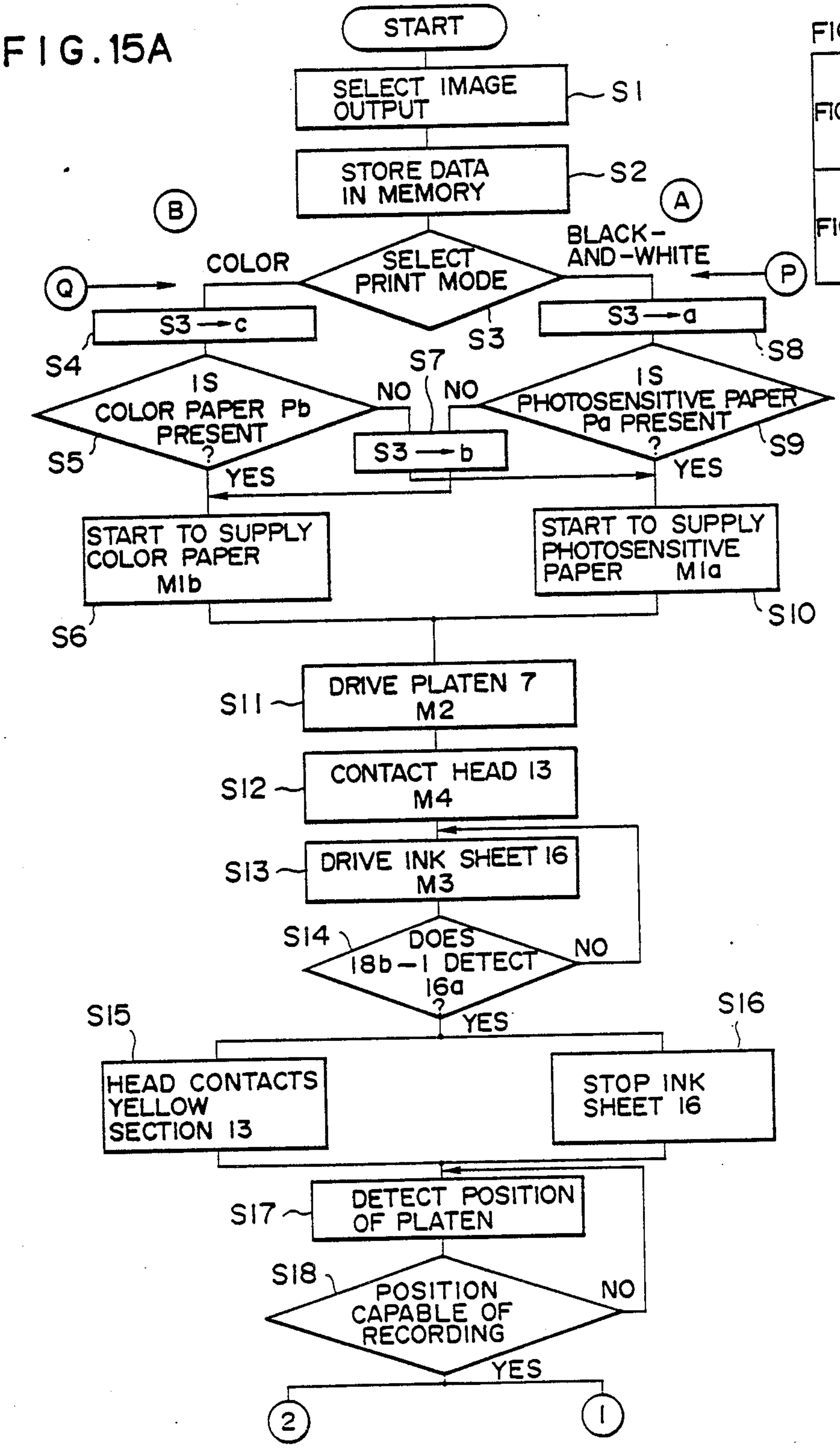
FIGS. 15A and 15B are flow charts showing a treatment process according to an embodiment of the present invention.
Figure 15:
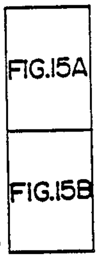

Next, the recording sequence in each of the color and black-and-white modes will be explained with reference to a flow chart shown in FIG. 15. During one line is recorded, the pulses are generated in accordance with the number n of harmonizations.

At first, in a step S1, the image signal input terminal shown in FIG. 7A is manually or automatically selected. In a step S2, the inputted image data is stored in the memory. Next, in a step S3, the color image or the black-and-white image is selected on the basis of a signal from a print mode designating portion 46 shown in FIG. 7B. This selection is normally performed manually; however, it may be performed automatically by discriminating the print mode to be selected when the data is stored in the memory.

After the print mode is set, the sequence follows a black-and-white image print sequence shown by Ⓐ or a color image print sequence shown by Ⓑ.

Firstly, the black-and-white image print sequence shown by Ⓐ will be explained. At first, in a step S8, the switch S3 is switched to a after the print mode is set, and in a step S9, the photo-sensors 4*a* and 4*b* discriminate the presence of the thermosensitive papers Pa and whether the thermosensitive papers Pa are positioned in the cassette A or in the cassette B. If the thermosensitive paper Pa is absent, the sequence shifts to a step S6 in the color image print sequence Ⓑ, and the process that the black-and-white image is recorded on the recording paper Pb for the color image is effected as will be explained later. If the thermosensitive papers Pa are present, the sequence goes to a step S10, where, for example when the thermosensitive papers Pa are positioned in the cassette A, a paper feed motor M1a is energized to feed the recording paper to the platen 7 through the pinch roller 8.

Next, in a step S11, the platen 7 is started to rotate, and in a step S12, the thermal head is pressed against the platen 7. In this case, the optimum pressure by means of the head 13 and platen 7 is exerted on the thermosensitive recording paper Pa, by appropriately charging the torsion coil spring 23 by means of the motor M4. Next, in a step S13, the inked sheet 16 is driven by the motor M3 so that the thermal head 13 is pressed against the portion $l+\alpha$ of the transparent section T of the inked sheet 16 shown in FIG. 4. The photo-transistors 18*b* for detecting the signals from the photo-diodes 18*a* arranged on both sides of the free end of the head 13 comprise a portion 18*b*-1 for detecting the marker 16*a* shown in FIG. 4 and a portion 18*b*-2 for detecting the marker 16*b*. In a step 14, the inked sheet 16 is shifted in a direction shown by an arrow until the portion 18*b*-1 outputs a detection signal. Incidentally, when the detection signal is firstly outputted from the portion 18*b*-2, the inked sheet 16 is shifted in the reverse direction, thereby preventing useless feed of the inked sheet. In this point, the thermal head 13 and the inked sheet 16 are set in a relative position where the image can be recorded. In a step S16, the inked sheet 16 is stopped. Next, in a step S17, the position of the platen 7 is detected by the detector (not shown) for detecting the angle of rotation of the platen. And, when it is judged that the position of the recording paper is in the recordable position in a step S18, the recording of the image is started in a step S19. Next, when it is judged that the recording of the image has been completed in a step S20, in a step S21, since the paper guide levers 12 are in the position shown by the broken line (i.e., the plunger PL is disenergized), the thermosensitive paper Pa is guided by the upper edges 12*b* of the levers and discharged into the discharge tray 11. Next, in a step S22, the rotation of the platen 7 is stopped. Thereafter, in a step S23, it is judged whether the continuous recording should be performed or not. If the continuous recording is performed, it is judged whether the black-and-white image is recorded or the color image is recorded in a step S24. In case of the black-and-white image recording, the sequence returns to Ⓟ, whereas, in case of the color image recording, the sequence returns to Ⓠ in FIG. 15. Incidentally, if it is judged that the continuous recording is not required in the step S23, the sequence is completed.

Next, the color image print sequence will be explained. After the color recording mode is selected in the step S3, in a step S4 the switch S3 is switched to c, and in a step S5, it is determined whether the recording papers Pb for the color image are existed or not and which cassettes A, B should be used. If it is judged that the recording paper Pb is absent, the sequence is shifted to a step S7, where the switch S3 is switched to b. Then, the sequence goes to the step S10, from where the same process as mentioned above is effected, thus recording the black-and-white image converted from the color image on the thermosensitive paper Pa.

When it is judged that the recording papers for the color image are present, in the step S6, the recording paper for the color image is started to feed. Thereafter, the process until the head is pressed against the portion $l+\alpha$ of the transparent section T of the inked sheet 16 is the same as in the case of the above-mentioned black-and-white image; however, in the color image print mode, in a step S15, the inked sheet 16 is further shifted until the leading edge of the yellow section Y reaches the recording portion of the head 13 so that the recording can be performed from the yellow dye. And, by the steps S17~S30, from the point that recording paper Pb is reached to the recordable positions for each of three color data, the inked sheet 16 is shifted at the same speed as that of the recording paper Pb, thus performing the recording. In case of the color image recording, in order to perform the recording by three times (for Y, M, C), in a step S27, the paper guide levers 12 are energized until the two color recordings have been completed. When it is judged that the three color recordings have been completed in a step S31, in steps S32~S34, the paper guide levers 12 are disenergized to eject the recording paper Pb, and then the platen 7 is stopped. Next, in steps S35~S36, as in the case of the black-and-white image, if the continuous recording is desired, the sequence returns to the starting point Ⓟ or Ⓠ.

Incidentally, in the explanation mentioned above, although the sublimable dyes were used for the color recording and the recording paper having the ink receiver layer was used as the recording paper for the color image, soluble color inks may be used and the color image may be recorded on a plain paper. In this case, the values stored in the temperature/color correction harmonization ROM 44f are amended to values suitable for the soluble inks, or another similar ROM is provided and can be used by switching from the former ROM 44f to the latter ROM by means of an appropriate switch.

Further, it should be noted that the transparent section T of the inked sheet which is contacted to the thermal head in case where the thermosensitive recording paper is used may not be transparent, so long as the color material in that section is not heat-transferred to the thermosensitive paper and is capable of transmitting heat.

In addition, when the image having multi-harmonization is recorded on the thermosensitive paper, although the harmonization was controlled by the number of recording operations by means of the strobe signal having the same pulse widths, if it is desired to obtain a high quality black-and-white print image, as shown in FIG. 14, the recording may be performed by controlling the pulse widths of the strobe signal.

Figure 16:
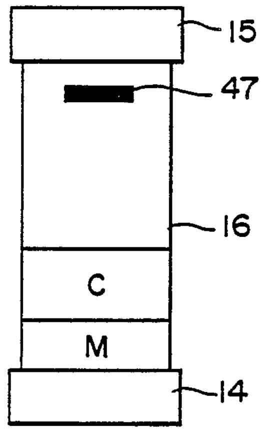
FIG. 16 is a plan view of an inked sheet according to another embodiment of the present invention.
Figure 17:
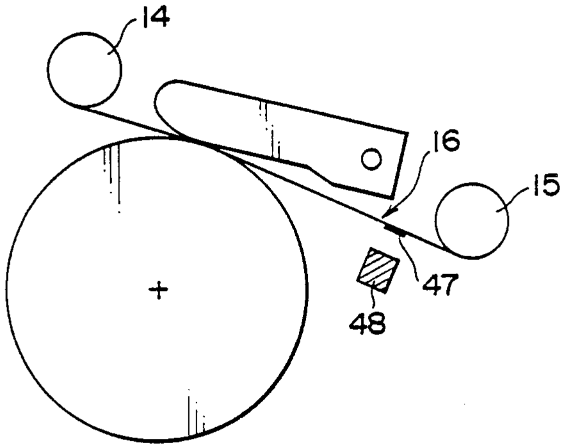
FIG. 17 is a side view of a mechanism according to the embodiment shown in FIG. 16.

Furthermore, as shown in FIG. 16, a marker 47 may be provided at one end portion of the inked sheet, and, as shown in FIG. 17, a photo-sensor 48 may be arranged in the vicinity of a supply side of the inked sheet, so that, when the marked end of the inked sheet is detected, the black-and-white image converted from the color image may be recorded on the thermosensitive paper.

As apparent from the afore-mentioned explanation, according to the illustrated embodiment of the present invention, in the color image print mode, when it is detected that the recording paper for the color image is absent or empty, the black-and-white image is recorded on the thermosensitive recording paper by outputting the image data converted from the color signal to the black-and-white signal by means of the brightness signal synthesizing circuit.

Further, in the black-and-white image print mode, when it is detected that the thermosensitive paper is absent, the image is recorded on the recording paper for the color image by using the colored inked sheet.

Consequently, both of the black-and-white image and the color image can be recorded by the same printer.

Further, it is no need to replace the inked sheet cassettes and the recording papers in accordance with the sort of the images to be recorded, thus simplifying the operation.

In addition, in the continuous recording operation, even if either of the thermosensitive paper or the recording paper for the color image is empty, the recording operation is not interrupted.

As mentioned above, according to the present invention, a thermal printer which can effectively record the image on the recording medium is provided.

We claim:

1. A thermal printer for recording an image on a recording medium, comprising:

- a first supply means for supplying a first recording medium;
- a second supply means for supplying a second recording medium different from said first recording medium;
- image processing unit having a memory means for storing inputted black-and-white image information and an inputted color image information;
- an inked sheet having a plurality of colors, for recording a color image on said first recording medium;
- a recording means for recording images on said first recording medium and on said second recording medium; and
- a control means for operation of said first or second supply means and of said inked sheet, in accordance with conditions whether a black-and-white image stored in said memory means is to be recorded or whether a color image stored in said memory means is to be recorded.

2. A thermal printer as set forth in claim 1, wherein said first recording medium is a heat transfer recording sheet having a receiver layer for receiving ink sublimated from said inked sheet.

3. A thermal printer as set forth in claim 1, wherein said first recording medium is a plain paper.

4. A thermal printer as set forth in claim 1, wherein the image information stored in said memory means is input from a telephone circuit.

5. A thermal printer as set forth in claim 1, wherein the image information stored in said memory means is input are inputted from a video circuit.

6. A thermal printer as set forth in claim 1, wherein said memory means included in said image processing portion comprises a memory for a black-and-white image and a memory for the color image.

7. A thermal printer as set forth in claim 1, wherein said image processing portion receives selectively said black-and-white image information and said color image information, and wherein said black-and-white image information is input to a black-and-white demodulator to be demodulated, and said color image information is input to a color demodulator to be demodulated.

8. A thermal printer as set forth in claim 1, wherein said second recording medium is a thermosensitive sheet colored when heated.

9. A thermal printer as set forth in claim 1, further including a first detecting means for detecting the presence of said first recording medium supplied by said first supply means.

10. A thermal printer as set forth in claim 1, further including a second detecting means for detecting the presence of said second recording medium supplied by said second supply means.

11. A thermal printer as set forth in claim 1, wherein supply passages through which said first and second recording mediums are supplied to a recording position are in common.

12. A thermal printer, comprising:

- a color recording sheet supply means for supplying a recording sheet for a color image;
- a thermosensitive sheet supply means for supplying a thermosensitive sheet for a black-and-white image;
- an inked sheet having ink portions for recording said color image;
- a brightness signal synthesizing circuit for synthesizing a brightness signal from R, G, B signals or Y, M, C signals;
- a first recording mode setting means for setting whether either the black-and-white image or the color image is to be recorded;
- a color recording sheet detecting means for detecting the absence of sheet in said color recording sheet supply means;
- a thermosensitive sheet detecting means for detecting the absence of sheet in said thermosensitive sheet supply means;
- a mode changing means for changing a black-and-white image recording mode to a color image recording mode when said thermosensitive sheet detecting means detects the absence of sheet;
- a second recording mode setting means for setting a mode which records the black-and-white image on the basis of data outputted from said brightness signal synthesizing circuit, when said color recording sheet detecting means detects the absence of sheet; and
- a control means for controlling movements of said inked sheet and of said thermosensitive sheet or said recording sheet for the color image, in accordance with each of the modes set by said first and second recording mode setting means.

13. A thermal printer as set forth in claim 12, further including a common supply passage through which said recording sheet for the color image and said thermosensitive sheet for the black-and-white image are supplied to a recording position.

* * * * *